Nov. 15, 1938.　　　F. E. NELSON　　　2,137,179
SPRING TOGGLE UNIVERSAL JOINT
Filed July 9, 1938　　　3 Sheets-Sheet 1
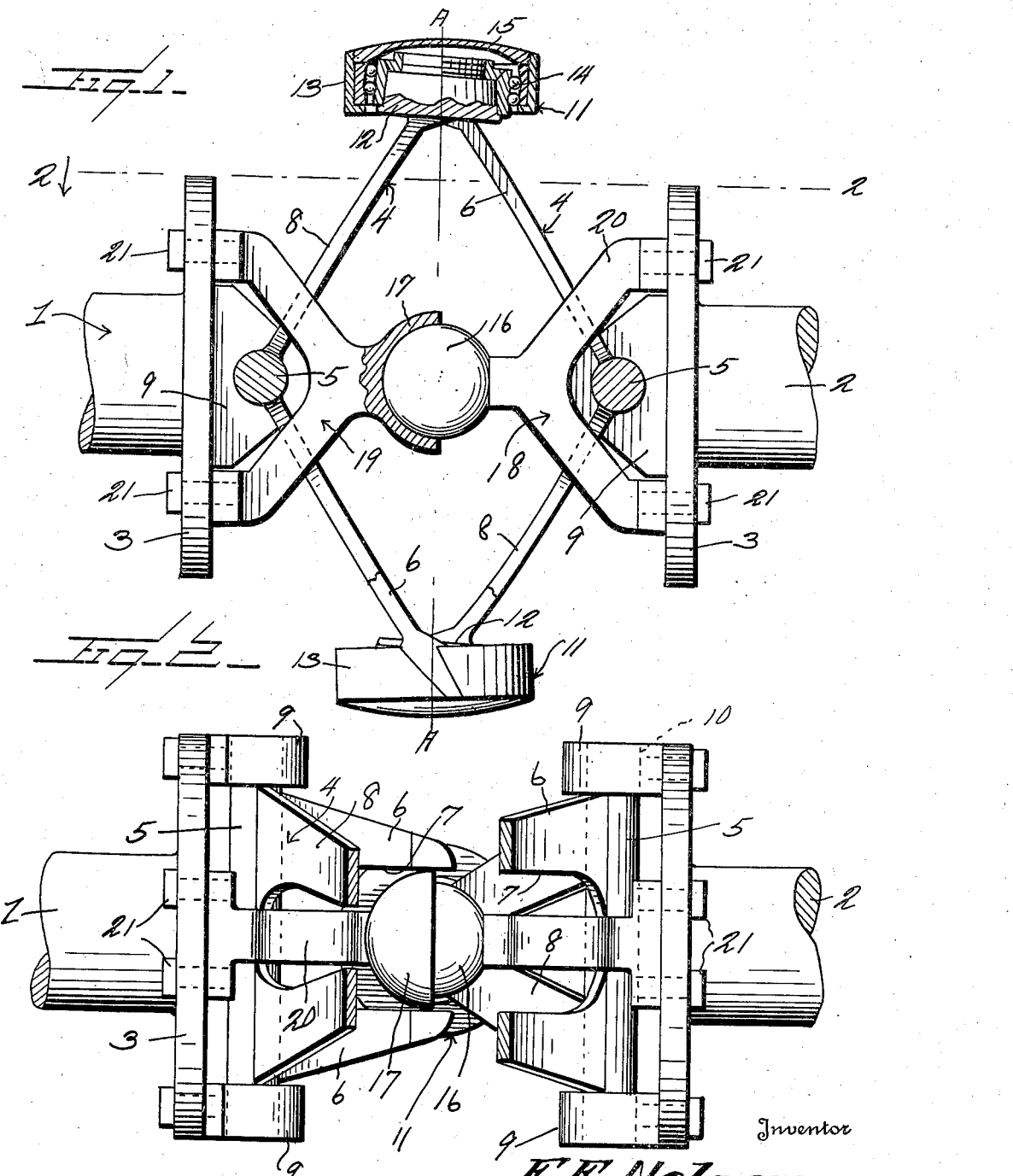
Inventor
F. E. Nelson
By Watson E. Coleman
Attorney

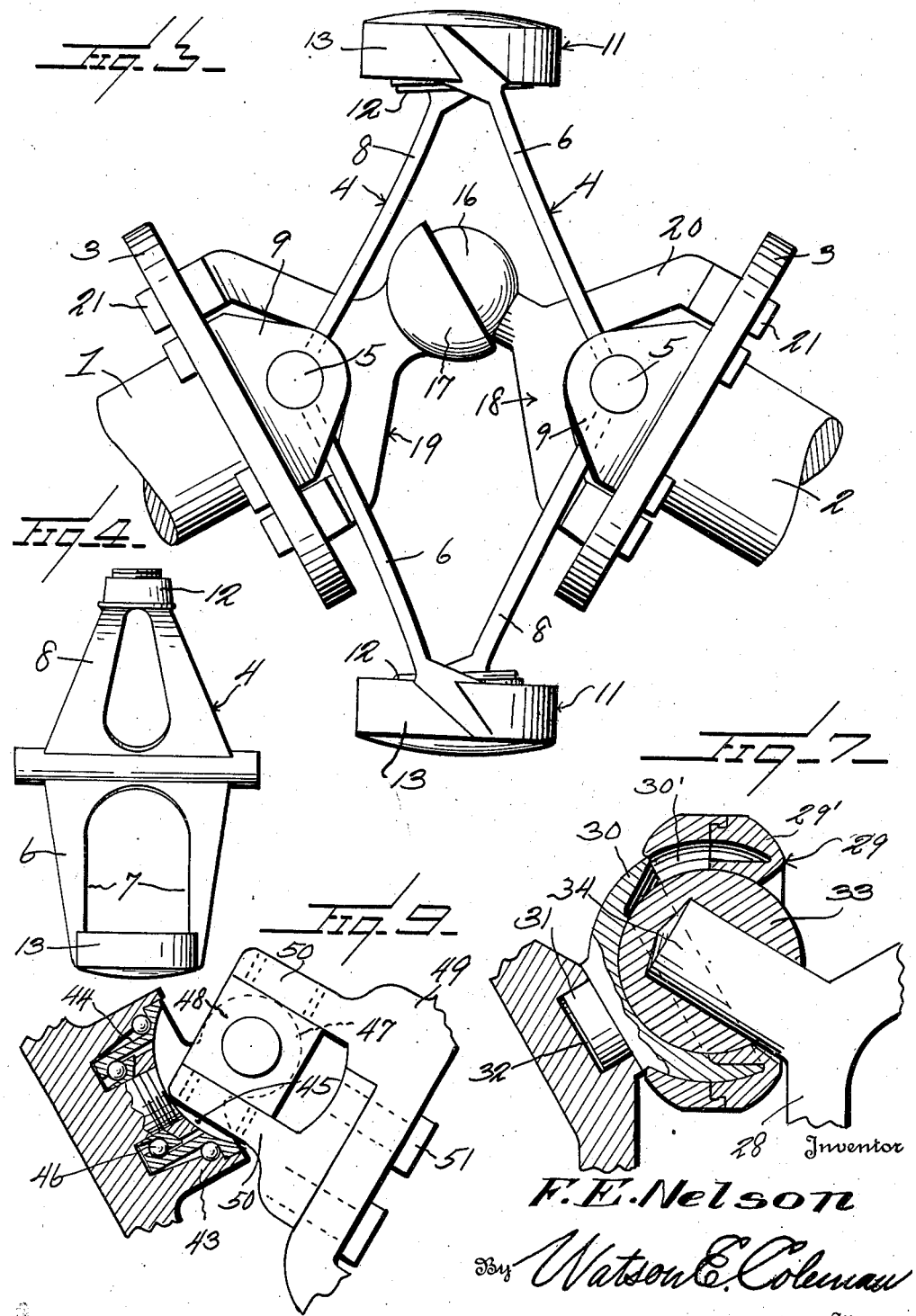

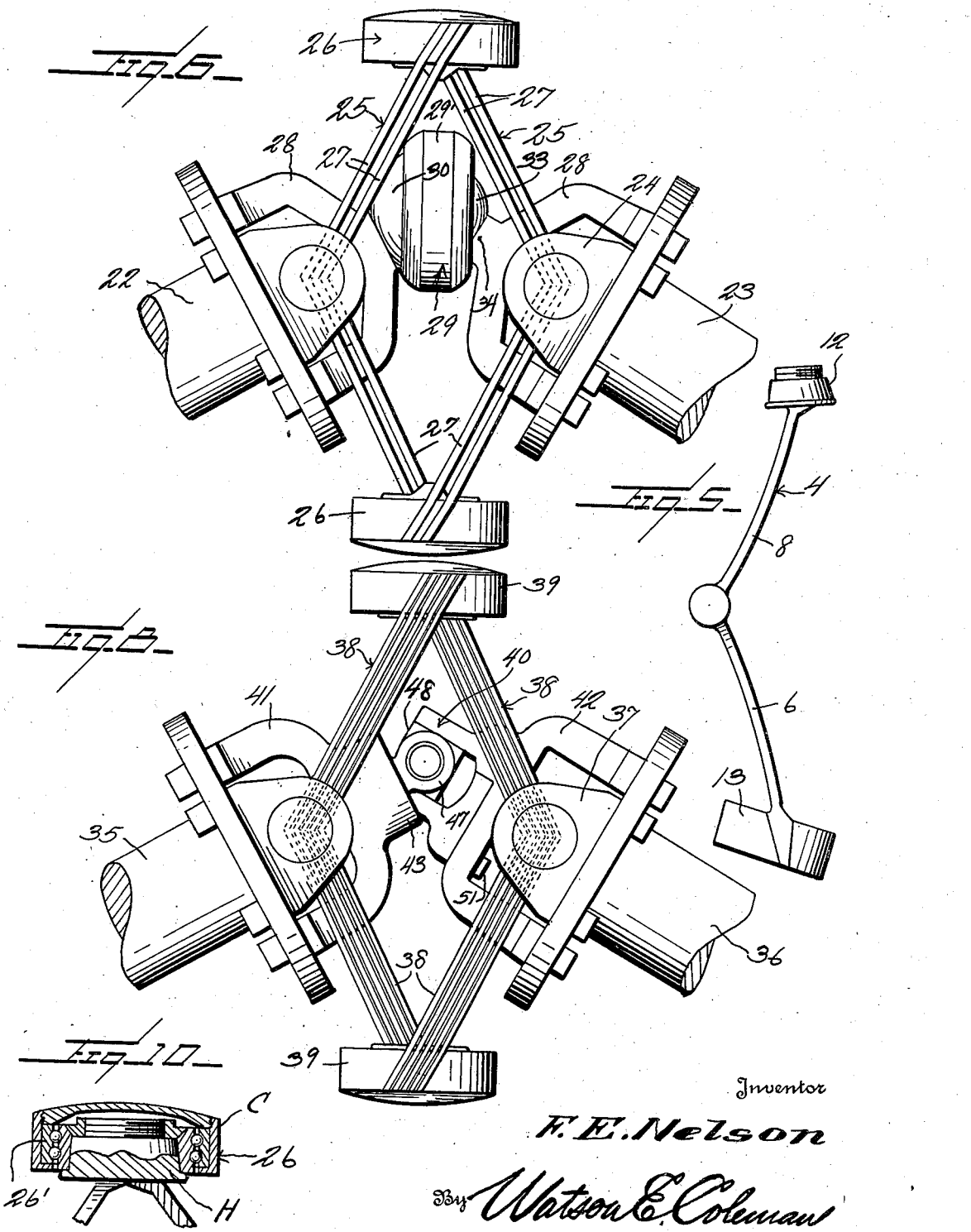

Patented Nov. 15, 1938

2,137,179

UNITED STATES PATENT OFFICE 2,137,179

SPRING TOGGLE UNIVERSAL JOINT

Frank E. Nelson, Belmont, Mass.

Application July 9, 1938, Serial No. 218,447

8 Claims. (Cl. 64—21)

This invention relates to the class of shaft couplings and pertains particularly to improvements in universal joints or couplings.

The present invention has for its primary object to provide a novel and improved form of universal coupling by the use of which a constant velocity of rotation will be transmitted from a driving shaft to a driven shaft or, in other words, the use of the universal joint embodying the present invention, as a coupling means between two shafts will effect the rotation of the driven shaft at the exact speed of the driving shaft regardless of any or all changes which may occur in the angular relations of the axes of the two shafts up to a designed angular limit.

Still another object of the invention is to provide an improved universal joint coupling for shafts consisting of resilient toggle members joined together and to the said shafts in a novel manner whereby the desired transmission of constant rotary speed from one shaft to the other is obtained.

Still another object of the invention is to provide, as hereinafter specifically pointed out, a spring toggle universal joint or coupling and novel means associated therewith for effectively centering the shaft sections which the spring toggle elements join together.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view of one embodiment of the universal joint constructed in accordance with the present invention, portions of the joint structure being in section.

Fig. 2 is a sectional view taken substantially on the line 2—2 of Fig. 1.

Fig. 3 is a view in elevation of the joint structure shown in Fig. 1 and illustrating the flexing of the parts when the connected shafts are angularly related.

Fig. 4 is a view looking at the face or flat side of one of the toggle units.

Fig. 5 is a view looking at the edge of a single ply toggle unit such as is shown in Fig. 1, showing the bowed initial formation of the two portions thereof.

Fig. 6 is a view illustrating a modification of the form of the invention as illustrated in Fig. 1.

Fig. 7 is a sectional view of the thrust or centering connection shown in elevation in Fig. 6.

Fig. 8 illustrates another modification of the invention as illustrated in Fig. 1.

Fig. 9 is a sectional view of the centering and thrust connection between the shafts and shown in elevation in Fig. 8.

Fig. 10 is a sectional view on an enlarged scale of one of the bearing units used in association with a multiple ply toggle joint.

Referring now more particularly to the drawings, the embodiment of the present invention as illustrated in Figs. 1 to 3, inclusive, will first be described, this embodiment being what might be termed a simple constructional form of the improved universal joint.

In the figures referred to, the numerals 1 and 2 indicate adjacent ends of shafts joined together by the universal coupling and may represent respectively driving and driven shafts. These shafts are in spaced alined relation, as shown, and each is here illustrated as having an enlarged end portion in the form of a plate 3 with which the toggle and centering units are joined. The toggles of the joint are each generally designated by the numeral 4, there being two of these elements in each joint assembly and, as shown in Fig. 4, each toggle is made up of an elongated flat body bent transversely midway of its ends and joined or formed integral with a hinge shaft 5 which extends transversely of the toggle along the line of the bend. This hinge shaft 5 divides each toggle into a pair of arm portions and one of these arm portions, which is indicated by the numeral 6, is bifurcated to form the two forks 7 while the other portion, which is indicated by the numeral 8, is reduced in width from the shaft end to the outer end thereof so that it is narrowed at its outer end and enabled to position in the area defined by the forks 7 of the portion 6 of the opposing toggle as hereinafter more specifically described.

The toggles 4 have considerable width as compared with their thickness and length, as will be readily apparent upon reference to Figs. 4 and 5, so that they are very stiff edgewise for driving purposes but are flexible flatwise so as to easily meet small geometrical changes occurring when the joint is in use, except when the driving and driven shafts are rotating on a common axis.

Each of the shafts has secured thereto through the medium of the head plate 3, a pair of spaced bearing ears, each of which is indicated by the numeral 9, each pair of ears being in opposed relation with the pair upon the other shaft plate and each pair of ears is provided with a suitable bore or opening 10 to receive an end of a toggle hinge shaft 5, as shown in Fig. 2, so that each toggle shaft is supported between a pair of ears of a shaft and the arrangement of the toggles is such that the ends of one will be in opposed relation with the ends of the other and the tapered portion 8 of one toggle will be directed into the area between the forks 7 of the portion 6 of the opposing toggle. The axes of the hinge shafts 5 are in or near and parallel to the apexes of the angles of the toggles as shown, and pass diametrically through the axes of their respective shafts. The amplitude of hinge action provided for each of these hinges is equal to or in excess of one-half of the total designed angular range of the universal joint.

The adjacent opposing ends of the toggles are connected together by suitable mating bearing parts incorporated in or on the ends of the toggles and each of these bearings is generally designated by the numeral 11. These bearings form or provide an axis of rotation perpendicular to the axes of the hinge shafts 5 and this axis provided by the bearings 11 bisects the diamond or lozenge-shaped figure formed by the union of the toggles, along its major axis. This axis which is designated by the line A, passes through the focus of the driving and driven shafts. The amplitude of hinge action provided between the toggles on this axis is equal to or in excess of the designed angular range of the universal joint.

While any suitable bearing may be used for coupling the adjacent ends of the toggle units, which will permit the toggles to oscillate on the axis A while at the same time permitting a certain degree of axial freedom or a relative rotary or semi-rotary movement between the joined toggle ends, the bearings here shown each consists of a hub portion 12 and a ring portion 13 between which is located an anti-friction assembly in which the outer raceway is transversely concave to permit the anti-friction elements to move across the raceway as well as around it. The outside of each unit 11 may be closed against the entrance of dust and dirt by the cap 15 and the hub portion of each unit has secured thereto the end of the tapered portion 8 of a toggle unit while the ring 13 is disposed between and secured to the ends of the forks 7 of the portion 6 of the opposing toggle unit. With this toggle-to-toggle connection, the toggles are permitted relative oscillatory motion on the axis indicated by the line A which passes through the radial centers of the bearing hubs 12 and the two portions of the bearing units are also permitted a slight rotary movement on axes perpendicular to the axis A.

Each spring toggle is formed, in the embodiment of the invention shown in Fig. 1, of one single piece of flexible or spring material, either metallic or non-metallic or of combinations of such materials.

Interposed between the ends of the shafts 1 and 2 is a centering or thrust unit which in the present described embodiment of the invention, consists of a ball 16 which is positioned in a socket 17, the ball being carried by the bracket unit 18 which is secured to the plate 3 of the adjacent shaft while the socket is carried by a similar bracket unit 19 which is secured to the plate 3 of the other shaft. Each of these brackets has two legs 20, one of which passes between the furcations 7 of the adjacent toggle while the other passes through an opening formed in the central part of the tapered portion 8 of the same toggle and bolts 21 or any other suitable securing elements are made use of for coupling the ends of the legs to their respective plates. Any other suitable type of joining or connecting means between the ends of the shafts may be used in place of the ball and socket connection illustrated, such as the connections shown in the forms of the invention illustrated in Figs. 6 and 8, as hereinafter particularly described, so long as such connection is allowed to rotate freely in its connection with one of the shafts of the main universal joint mechanism so that the centering and thrust part will be free to make rotational movements or fluctuations without breaking any part thereof or effecting the steady rotation of the main driven shaft. The centering and thrust element may be omitted from the universal joint provided that some form of centering and thrust mechanism is provided or made use of by bearings on the driving and driven shafts outside of the universal joint.

With the ball and socket type of centering or thrust unit, the toggles are made with the portions thereof initially bowed in the manner shown so that when they are assembled in the universal joint with their sections approximately straight as in Figs. 1 and 3, they will be under sufficient tension to hold the ball and socket elements together. When the shafts are alined, as shown in Fig. 1, the sections of the toggles will be only slightly longitudinally bowed outwardly and when the shafts are in angular relation, as shown in Fig. 3, the sections of the toggles will be flexed in the opposite direction so that the slight bowing thereof will be inwardly. These single piece or single ply toggles will always flex in a manner to make a simple bend or bow with the ends connected by the pivot connections or bearings which have been shown and described. These toggle portions may be made in multiple ply form instead of the single form shown in Fig. 1, such multiple ply form of the toggle sections being shown in Figs. 6 and 8 where two and five ply sections for the toggles are disclosed. These multiple ply toggles will always flex with double or sigmoid bends as illustrated, if the plies form parallelogram spring sections as shown.

These forms of the invention illustrated in Figs. 6 and 8 also show different types of centering and thrust units which may be employed.

Referring more particularly to Fig. 6, the bodies connected by the toggle joint here illustrated as shafts, are designated by the numerals 22 and 23 and the toggle units which are pivotally joined thereto through the medium of the ears 24, are generally designated by the numerals 25 and are shown as having their opposing ends coupled together by bearing units 26, one of which is illustrated in section in Fig. 10. As shown, these bearing units are similar in construction to the bearing units shown in section in Fig. 1, except that the anti-friction mechanism indicated generally by the numeral 26' which is interposed between the hub H and casing C, is formed so that no relative rotary movement is permitted between the parts H and C on an axis perpendicular to the oscillatory axis passing through the axial centers of the bearings, such as is permitted in the bearing structure shown in section in Fig. 1. The angularly related portions of the toggles are made up of spaced parallel plates 27 which have the same configuration when viewed in plan as in Fig. 4, as the corresponding portions of the single ply toggles 4, but it will be recognized that these multiple ply toggles bend differently from the single ply form of toggle.

Coupling the adjacent ends of the shafts 22 and 23 through the medium of brackets 28, is a centering and thrust unit 29 which, as shown in Fig. 7, consists of a socketed head 30 having a stem 31 which is secured to the bracket 28 as by insertion into the socket 32 in which it is held against rotation or other movement relative to the bracket. The socketed head 30 receives a ball 33 which is secured to a stem 34 forming a part of the other bracket 28 and the head and socket are encircled by a two-part ring member 29' which is carried upon the ball as shown, and is recessed in the side facing the edge of the socket 30, as shown at 30', to receive the edge of the socket in the movements of these two parts. This joint may be described as a modified form of the joint shown in Fig. 1 and the ring makes the joint capable not only of withstanding compression forces but also of withstanding parting forces. The ring 29' is allowed to float freely within the limits of the area between the edge of the socket 30 and the ball and with this construction there is obtained a closed ball and socket joint having an overall working angularity of 120°.

A similar construction as regards the multiple ply toggles and separation preventing centering and thrust unit, is shown in the form of the invention illustrated in Fig. 8. Here the shafts 35 and 36 have connected with their adjacent ends the ears 37 which pivotally support the toggle units 38 which are the same configuration as the units 25 and have their outer and opposed ends coupled together by the bearing units 39 which are of the same construction as the unit 26, shown in detail in Fig. 10. In this form of the invention, the centering and thrust unit which is indicated generally by the numeral 40 is substantially in the form of a standard or common type of universal joint but is so designed that while it will prevent the adjacent ends of the shafts from separating, it is allowed to rotate freely in its connection with one of the shafts of the main universal joint mechanism and, as shown in Fig. 9, this unit 40 has its two portions connected with the adjacent shafts through the medium of the brackets 41 and 42. The bracket 41 has a center extension 43 which lies within the area defined by the joined toggle units 38 and which has a socket 44 in its end in which there is installed the rotary head piece 45. A suitable anti-friction mechanism 46 lying in the socket permits the head piece 45 to turn freely. This head piece includes a pair of spaced ears 47 between which is pivotally mounted a block 48.

The bracket 42 of the adjacent shaft has a two-part extension 49 which is formed to provide a pair of spaced ears 50, one of which is detachably joined to the bracket, as shown in Fig. 9, by bolts or other suitable securing elements 51. The block 48 is pivotally supported between the ears 50 for oscillation on an axis perpendicular to the center of oscillation for the ears 47. Thus it will be seen that while the centering and thrust unit 40 has universal motion to conform to the relative movements of the adjacent ends of the shafts 35 and 36, it does not function in any respect as a means of transmitting rotary motion from one of the shafts to the other.

The type of centering and thrust unit shown in Figs. 1 to 3 requires that the toggles be made in such a manner that when they are assembled in the universal joint, their spring sections will be under tension to hold the ball and socket together. With the types of centering and thrust units shown in Figs. 6 and 8, the toggles need not be under strain for the purpose of keeping the centering and thrust units in functioning relation, as such units are self-contained and maintain fixed connection one with the other and cause the spring toggle sections to make the slight flexures required of them when the universal joint is in use. All of the toggle spring sections are shown as being slightly flexed, the sections of the toggles 4 having a single longitudinal bow flexure while the sections of the toggles 25 and 38 are of a compound curvature or in the form of a sigmoid flexure. The axes of the shafts in Figs. 3, 6 and 8 are at an angle of approximately 60° from their alined positions. In these positions the toggle spring sections are flexed or distorted to the maximum and such maximum flexing of the toggle spring sections would also occur when the shafts are alined as in Fig. 1. When the shafts assume positions where the axes are at an angle of approximately 42° from a straight line corresponding to the alined centers of the shafts, the toggle spring sections will be substantially straight. The object of this is to keep the spring sections as straight as possible at all times and this is best accomplished by having them straight at their mid-working position.

The total flexing of each toggle is equal to the versine of one-half of the angle that the power transmitting axes are out of line. By designing the universal joint so that the toggle spring sections are straight when the toggle-to-shaft hinge shafts are at their mid-movement due to this flexure, the greatest flexure of the toggle spring sections is reduced to one-half as much as it would be if it were all to one side of a straight line and the greatest flexure will then only be equal to the haversine of one-half of the angle that the power transmitting axes are out of line.

As previously stated, the multiple ply toggle spring sections have a sigmoid bend or curvature, with their greatest curvature at the points where the spring plies are anchored into the solid parts of the toggles, that is, where the ends of the toggle portions join the parts of the connecting bearings and where they join the hinge shafts. These spring sections will naturally bend in this manner as the spring plies, being parallel to each other, cause parallel action to take place whenever they are flexed in any way. As a result, the axes of the bearings at the connected toggle ends tend to remain parallel to the axis A at all times. This makes it possible to use single axis bearings for multiple ply toggle end bearings.

Such bearings may also be used with single ply toggles but in such case, the bearings must be of rugged construction sufficient to force and maintain the alinement as the spring sections of single ply spring toggles will normally bend as shown in Figs. 1 and 3, with simple bends and call for bearings with some axial freedom at their ends. This local axial freedom will not affect the toggle-to-toggle pivot axis represented by the axis line A.

While the illustration of the invention has been confined to showing it as connecting the ends of a pair of shafts and reference has been made repeatedly to these shafts in the description of the invention, it is to be understood that the invention is not to be limited in use to the coupling of shafts alone but may be used in all places where its function is desirable, as for example, it may be used for coupling together wheels or other turning members which may have relative axial movement or for connecting pendant units from supporting structures where such pendant units are intended to have unlimited swinging movement.

What is claimed is:—

1. A universal joint coupling for a pair of adjacent rotatable bodies, comprising a pair of elongated members bent transversely midway of their ends, means pivotally coupling each of said members with a body for oscillation on an axis perpendicular to and passing through the axis of rotation of the body, the oscillation axis for each member extending along the line of bend of the member, said members having their ends in opposed relation, and pivotal coupling means between the opposed ends of the members whereby the members may oscillate relatively on an axis perpendicular to the first-mentioned axis of oscillation and passing through the rotary centers of the bodies.

2. A universal joint coupling for a pair of adjacent rotatable bodies, comprising a pair of elongated members bent transversely midway of their ends, means pivotally coupling each of said members with a body for oscillation on an axis perpendicular to and passing through the axis of rotation of the body, the oscillation axis for each member extending along the line of bend of the member, said members having their ends in opposed relation, and pivotal coupling means between the opposed ends of the members whereby the members may oscillate relatively on an axis perpendicular to the first-mentioned axis of oscillation and passing through the rotary centers of the bodies, said elongated members being adapted to flex transversely between the pivotal means joining their ends and the pivotal means joining their intermediate portions with the bodies.

3. A universal joint coupling for connecting the adjacent ends of a pair of shafts, comprising a pair of toggle members each consisting of an elongated body of resilient material bent transversely intermediate its ends, means forming a pivot shaft extending along the line of bend of each member, means pivotally coupling the ends of each pivot shaft with one of said first shaft ends whereby said elongated members are arranged in end adjoining relation to form a substantially diamond-shaped frame between said shaft ends, a bearing connection between the adjacent ends of said elongated members whereby said members may have relative oscillation on an axis extending along the major axis of said frame, said last axis passing through the axial centers of the shafts and being perpendicular to said pivot shafts and said elongated members being flexible transversely between the connected ends and the pivot shafts.

4. A universal joint coupling for connecting the adjacent ends of a pair of shafts, comprising a pair of toggle members each consisting of an elongated body of resilient material bent transversely intermediate its ends, means forming a pivot shaft extending along the line of bend of each member, means pivotally coupling the ends of each pivot shaft with one of said first shaft ends whereby said elongated members are arranged in end adjoining relation to form a substantially diamond-shaped frame between said shaft ends, a bearing connection between the adjacent ends of said elongated members whereby said members may have relative oscillation on an axis extending along the major axis of said frame, said last axis passing through the axial centers of the shafts and being perpendicular to said pivot shafts and said elongated members being flexible transversely between the connected ends and the pivot shafts, and a centering and thrust unit coupling the opposed ends of the shafts and operating to maintain the shafts in a predetermined spaced relation when alined.

5. A universal joint, comprising a frame of substantially diamond-shape configuration, said frame being divided on its major axis into two portions, pivot means extending transversely of the frame at each of the angles on the minor axis thereof, said pivot means being adapted for connection with adjacent ends of a pair of power transmitting shafts, the centers of oscillation for said pivot means being upon the radial centers of the shafts, pivot means coupling the said portions of the frame for relative oscillation upon a center extending through the major axis thereof, and a pair of bracket members each adapted to be rigidly secured to an end of a power transmitting shaft and having a universal connection therebetween and having its pivotal center lying in the major axis of said frame.

6. A universal joint for coupling together adjacent ends of a pair of power transmitting shafts, comprising a pair of elongated units of materially greater width than thickness, each of said units being bent transversely midway between its ends, means for pivotally coupling each of said units with an end of a shaft for oscillation on a center extending parallel with the line of bend of the unit and passing through the radial center of the shaft, each of said units being bifurcated at one end and of tapering width at its other end, said units being so arranged that the tapered end of one will be disposed centrally between the furcations of the bifurcated end of the other, and pivotal coupling means between the adjacent ends of the units for the relative oscillation of the units about an axis extending through the centers of said ends and through the radial centers of the shafts, said last axis being perpendicular to the first-mentioned oscillation axes of the units.

7. A universal joint for coupling together adjacent ends of a pair of power transmitting shafts, comprising a pair of elongated units of materially greater width than thickness, each of said units being bent transversely midway between its ends, means for pivotally coupling each of said units with an end of a shaft for oscillation on a center extending parallel with the line of bend of the unit and passing through the radial center of the shaft, each of said units being bifurcated at one end and of tapering width at its other end, said units being so arranged that the tapered end of one will be disposed centrally between the furcations of the bifurcated end of the other, and pivotal coupling means between the adjacent ends of the units for the relative oscillation of the units about an axis extending through the centers of said ends and through the radial centers of the shafts, said last axis being perpendicular to the first-mentioned oscillation axes of the units, said units being transversely flexible between the first-mentioned pivot centers therefor and the pivotally joined ends thereof.

8. A universal joint for coupling together adjacent ends of a pair of power transmitting shafts, comprising a pair of elongated units of materially greater width than thickness, each of said units being bent transversely midway between its ends, means for pivotally coupling each of said units with an end of a shaft for oscillation on a center extending parallel with the line of bend of the unit and passing through the radial center of the shaft, each of said units being bifurcated at one end and of tapering width at its other end, said units being so arranged that the tapered end of one will be disposed centrally between the furcations of the bifurcated end of the other, and pivotal coupling means between the adjacent ends of the units for the relative oscillation of the units about an axis extending through the centers of said ends and through the radial centers of the shafts, said last axis being perpendicular to the first-mentioned oscillation axes of the units, said units being made up of a series of parallel laminations which are transversely flexible between the first-mentioned pivotal centers and the adjacent adjoined ends thereof.

FRANK E. NELSON.